United States Patent [19]
Eklund

[11] 3,920,250
[45] Nov. 18, 1975

[54] HIGH PRESSURE SHAFT SEAL STRUCTURE

[76] Inventor: Phillip R. Eklund, 991 Stanwick Drive, Dayton, Ohio 45430

[22] Filed: Feb. 19, 1974

[21] Appl. No.: 443,471

[52] U.S. Cl. .................... 277/51; 277/37; 277/152; 277/149; 277/212 F
[51] Int. Cl.² ...................... F16J 15/16; F16K 41/00
[58] Field of Search ............. 277/35, 140, 205, 149, 277/182, 154, 155, 165, 212 C, 229, 138 R, 44, 51, 152, 153, 157, 164, 212 F; 267/1.5

[56] References Cited
UNITED STATES PATENTS

| | | | |
|---|---|---|---|
| 2,273,962 | 2/1942 | Hubbard | 277/35 |
| 2,804,324 | 8/1957 | Stallings | 277/153 |
| 2,826,441 | 3/1958 | Niessen | 277/205 |

*Primary Examiner*—Richard E. Aegerter
*Assistant Examiner*—L. Footland
*Attorney, Agent, or Firm*—Jacox & Meckstroth

[57] ABSTRACT

Shaft seal structure for a shaft which is rotatably and/or reciprocally movable. The shaft seal structure is adapted to be positioned within a housing which separates a relative high pressure fluid from a relatively low pressure fluid. The structure includes sealing elements which slidably engage the shaft and pressure elements which urge the sealing elements toward the shaft. The sealing elements include a sleeve and a flexible annular flange which extends laterally from the shaft and which is attached to the housing. Preferably, the pressure elements are resilient U-shaped fingers which are joined to the housing.

5 Claims, 2 Drawing Figures

HIGH PRESSURE SHAFT SEAL STRUCTURE

Background of the Invention

In numerous types of situations a shaft which rotatably and/or reciprocally moves is operated within an environment in which there is a relatively high fluid pressure region and a relatively low pressure region. It is therefore necessary to provide sealing means which maintain a portion of the shaft in a high pressure region and which maintains a portion of the shaft in the low pressure region.

An object of this invention is to provide shaft seal structure which is capable of sealing against very high fluid pressures and which is capable of sealing against fluid pressures of lesser values.

It is another object of this invention to provide such shaft seal structure which can be installed as a unit in an opening in a wall.

Other objects and advantages of this invention reside in the construction of parts, the combination thereof, the method of manufacture, and the mode of operation, as will become more apparent from the following description.

Detailed Description of the Preferred Embodiment

Figure 1:
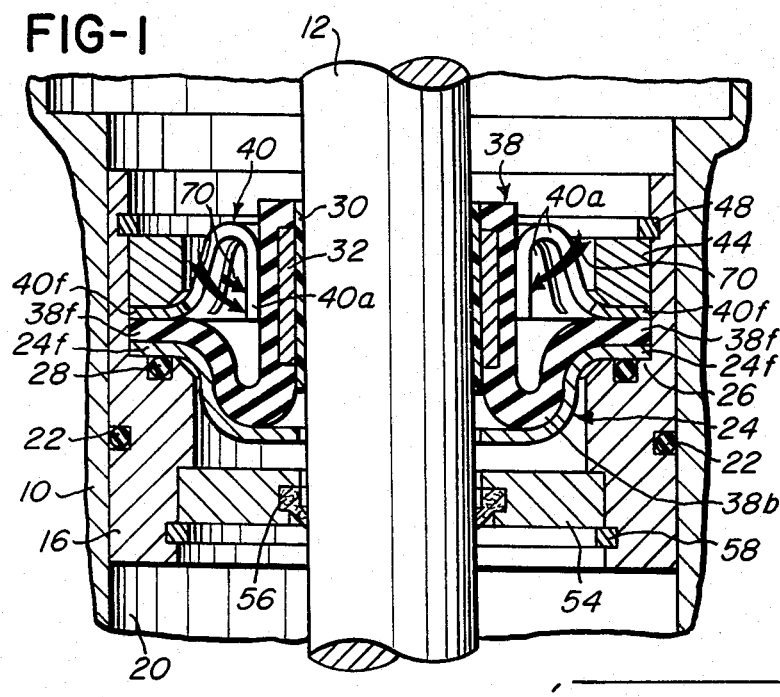
FIG. 1 is a sectional view showing the shaft seal structure of this invention encompassing a shaft and positioned within a wall.
Figure 2:
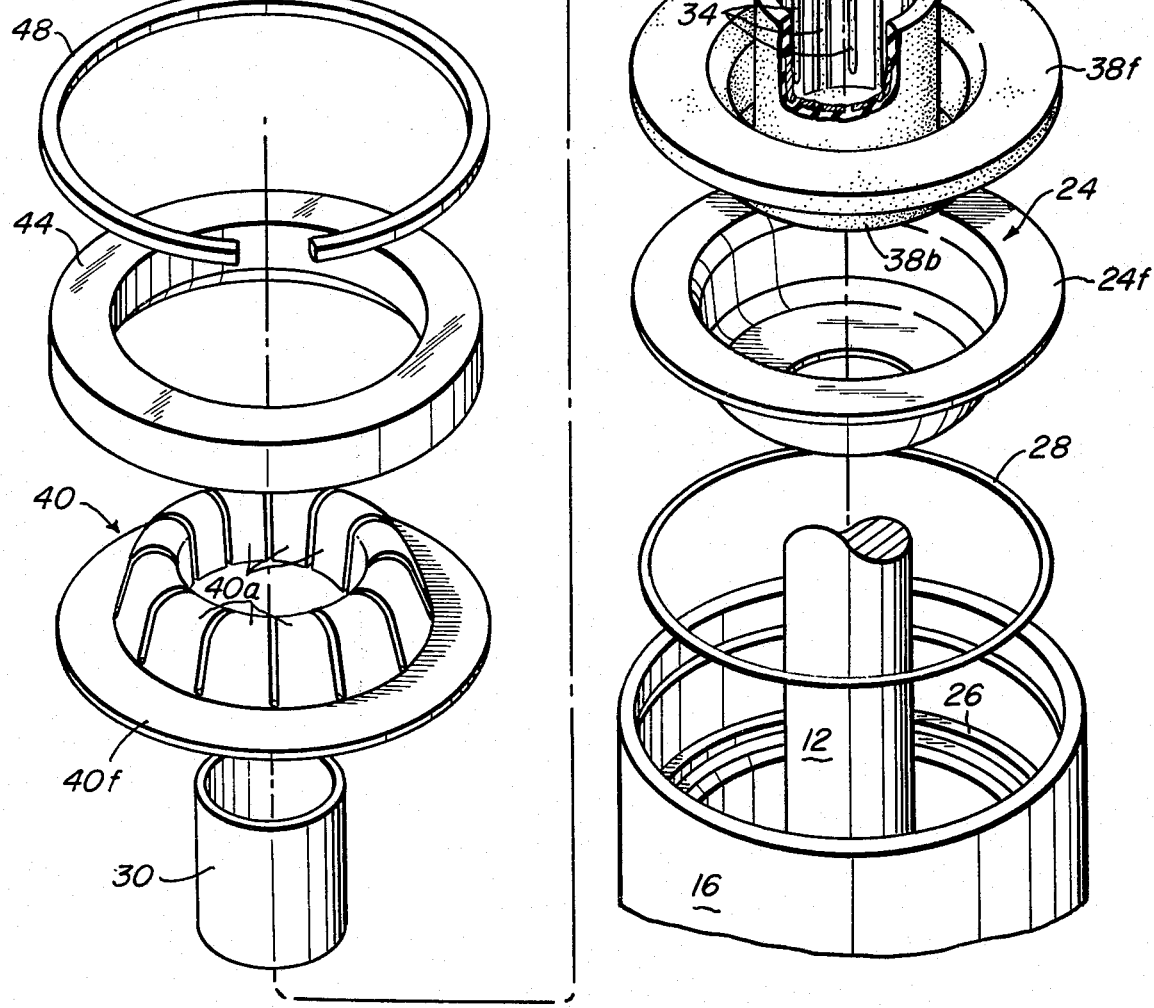
FIG. 2 is an exploded perspective view, with parts broken away and drawn on a smaller scale than FIG. 1, of the shaft seal structure of FIG. 1.

Shaft seal structure of this invention is adapted to operate within a wall, such as a wall 10. A shaft 12 is positioned within the wall 10. A cartridge 16 is firmly positioned within an opening 20 of the wall 10, and may, if desired, be an integral part of the wall 10. However, preferably, the cartridge 16 is a separate unit secured within the opening 20 to provide ease of assembly and installation of the shaft seal structure of this invention. An elastomeric O-ring 22 is shown recessed within the periphery of the cartridge 16 and in sealing engagement with the wall 10.

A support plate 24 encompasses the shaft 12 and has a flange portion 24f which engages a shoulder 26 of the cartridge 16. An elastomeric O-ring 28 is shown recessed within the shoulder 26 and is in engagement with the flange portion 24f of the support plate 24.

An anti-friction sleeve 30 slidably encompasses the shaft 12. The anti-friction sleeve 30 is preferably of "Teflon" or other suitable material having a very low coefficient of friction. The sleeve 30 is tightly encompassed by an expansion bushing or connector sleeve 32. The inner surface of the expansion bushing 32 is firmly secured to the anti-friction sleeve 30. Preferably, the inner surface of the expansion bushing 32 is bonded to the anti-friction sleeve 30 and is knurled in order to prevent relative axial movement between the sleeve 30 and the expansion bushing 32. The expansion bushing 32 is, preferably, of a suitable metallic material and has axially extending slots 34 therein, which readily permit slight changes in diameter of the bushing 32.

The expansion bushing 32 is recessed within an elastomeric sealing sleeve 38 which has a flange portion 38f extending laterally from one end thereof. The elastomeric material is a material such as Dupont VITON, which is suitable for use in relatively high temperature, or a silicone material, or the like. The flange 38f has an intermediate portion 38b which engages the support plate 24. The expansion bushing 32 provides rigidity in the connection of the anti-friction sleeve 30 to the elastomeric sealing sleeve 38.

A pressure member 40 encompasses the sealing sleeve 38 and has a plurality of spaced-apart resilient U-shaped fingers 40a in engagement with the sealing sleeve 38. The pressure member 40 also has a flange portion 40f which is in engagement with the flange portion 38f of the sealing sleeve 38.

A clamping ring 44 engages the flange portion 40f of the pressure member 40. A snap ring 48 is recessed in the cartridge 16 and engages the cartridge 16 and engages the clamping ring 44 and maintains the positions of the flange portions 40f, 38f, and 24f with respect to the cartridge 16.

Shown in FIG. 1, positioned below the support plate 24, is a carrier 54 which encompasses the shaft 12 and which supports an elastomeric wiper ring 56 which engages the shaft 12. A snap ring 58 is recessed in the cartridge 16 and engages the carrier 54, to maintain the position thereof.

OPERATION

The upper portion of the shaft 12, as shown in FIG. 1, is positioned within a relatively high fluid pressure condition, and the lower portion of the shaft 12 is positioned within a relatively low pressure condition. Thus, shaft seal structure of this invention seals against flow of fluid from the upper region to the lower region shown in FIG. 1.

Initially the principal sealing pressure applied to the sleeve 30 is the pressure applied by the fingers 40a of the pressure member 40, such pressure being applied through the elastomeric sleeve 38 and the connector sleeve 32. However, as fluid pressure at the upper region of the wall 10 increases, the fluid pressure, acting through the spaces between the fingers 40a, is applied to the outer surface of the sealing sleeve 38, as illustrated by arrows 70. Thus, the pressure of the fluid at the upper region of the wall 10 urges the sealing sleeve 38 and the sleeves 32 and 30 toward the shaft 12 for sealing against flow of fluid from the upper region to the lower region. Thus, the structure of this invention is capable of very effective sealing action when subjected to relatively high fluid pressures. Due to the fact that the resilient fingers 40a apply a substantial pressure to the elastomeric sleeve 38, shaft seal structure of this invention is also capable of sealing against fluid pressures of values less than very high fluid pressures.

During rotational and/or axial movement of the shaft 12, sliding action occurs between the sleeve 30 and the shaft 12. when axial movement of the shaft 12 occurs there may also be axial movement of the sealing sleeve 38 and the expansion bushing 32 and the sleeve 30. Such axial movement of the sealing sleeve 38 is limited by the length of the intermediate portion 38b and the support plate 24, which is engageable by the intermediate portion 38b.

Although the preferred embodiment of the high pressure shaft seal structure has been described, it will be understood that within the purview of this invention various changes may be made in the form, details, proportion and arrangement of parts, the combination thereof, and mode of operation, which generally stated consist in a shaft seal structure capable of carrying out the objects set forth, as disclosed and defined in the appended claims.

The invention having thus been described, the following is claimed:

1. An improved high pressure seal assembly comprising a wall having a circular opening therein, a shaft which is adapted for reciprocal and/or rotatable movement within said opening in said wall, a cylindrical engagement sleeve of antifriction material mounted on the shaft and in sliding engagement therewith, a cylindrical expansion sleeve of rigid metallic material surrounding the engagement sleeve of anti-friction material and bonded thereto, the expansion sleeve having an axial length less than the axial length of the engagement sleeve so that opposed axial end portions of the engagement sleeve extend beyond corresponding end portions of the expansion sleeve, the expansion sleeve having a plurality of axially extending slots therein which are open at alternatingly opposite ends of the expansion sleeve, a sealing sleeve of elastomeric material having a cylindrical portion surrounding the expansion sleeve and bonded thereto, the cylindrical portion of the sealing sleeve having a part engaging the engagement sleeve at each axial end portion of the expansion sleeve so that the expansion sleeve is enclosed by the engagement sleeve and the sealing sleeve, the sealing sleeve having a flange portion extending from the cylindrical portion, means within said opening and connecting said flange portion to said wall, a pressure member surrounding the cylindrical portion of the sealing sleeve and having an annular outwardly projecting flange, the pressure member having a series of U-shaped resilient fingers extending from the annular flange and engaging the cylindrical portion of the sealing sleeve and urging the cylindrical portion of the sealing sleeve and the expansion sleeve and the engagement sleeve toward the shaft, and an annular support plate surrounding the shaft and engaging the sealing sleeve.

2. The high pressure seal assembly of claim 1 in which said means within said opening and connecting said flange portion to said wall includes a hollow cylindrical cartridge in sealing engagement with the wall and encompassing the sealing sleeve, the flange portion of the sealing sleeve being in sealing engagement with the hollow cylindrical cartridge, the annular flange of the pressure member being attached to the cartridge.

3. The high pressure seal assembly of claim 1 in which the support plate has a curved recess portion which is directed generally away from the pressure member, the U-shaped fingers of the pressure member having curved portions directed generally away from the pressure member.

4. The high pressure seal assembly of claim 1 which seals a relatively high fluid pressure region on one side of the wall from a relatively low fluid pressure region on the opposite side of the wall, in which the U-shaped resilient fingers of the pressure member are curved toward the high pressure side of the wall.

5. An improved high pressure seal assembly comprising a wall having a circular opening therein, a shaft which is reciprocally and/or rotatably movable within an opening in a wall, a cylindrical cartridge within the opening and encompassing the shaft and in sealing engagement with the wall, a cylindrical engagement sleeve of anti-friction material encompassing the shaft along a portion thereof and in sliding engagement therewith, a cylindrical expansion sleeve of rigid metallic material encompassing the engagement sleeve of anti-friction material and bonded thereto, the expansion sleeve having an axial length less than the axial length of the engagement sleeve so that opposed axial end portions of the engagement sleeve extend beyond corresponding end portions of the expansion sleeve, the expansion sleeve having a plurality of axially extending slots therein which are open at alternatingly opposite ends of the expansion sleeve, a sealing sleeve of elastomeric material having a cylindrical portion surrounding the expansion sleeve and bonded thereto, the cylindrical portion of the sealing sleeve having a part engaging the engagement sleeve at each axial end portion of the expansion sleeve so that the expansion sleeve is enclosed by the engagement sleeve and the sealing sleeve, the sealing sleeve having a flange portion extending from the cylindrical portion and in sealing engagement with the cartridge, a pressure member surrounding the cylindrical portion of the sealing sleeve and having an annular outwardly projecting flange attached to the annular cartridge, the pressure member having a series of U-shaped resilient fingers extending from the annular flange and engaging the cylindrical portion of the sealing sleeve and urging the cylindrical portion of the sealing sleeve and the expansion sleeve and the engagement sleeve toward the shaft, and an annular support plate encompassing the shaft and attached to the annular cartridge, a part of the flange portion of the sealing sleeve being in engagement with the annular support plate.

* * * * *